United States Patent [19]

Bossard et al.

[11] 4,262,167

[45] Apr. 14, 1981

[54] CABLE SPLICE CASE

[75] Inventors: Ronald G. Bossard, St. Paul; Robert B. Goodin, Brooklyn Park, both of Minn.

[73] Assignee: Minnesota Mining and Manufacturing Company, St. Paul, Minn.

[21] Appl. No.: 58,451

[22] Filed: Jul. 18, 1979

[51] Int. Cl.³ .......................................... H02G 15/113
[52] U.S. Cl. .................................... 174/92; 174/77 R
[58] Field of Search ..................... 174/91, 92, 93, 77 R

[56] References Cited

U.S. PATENT DOCUMENTS

| 2,788,385 | 4/1957 | Doering et al. | 174/92 |
|---|---|---|---|
| 3,061,666 | 10/1962 | Duvall et al. | 174/77 R |
| 3,175,032 | 3/1965 | Strauss | 174/93 |
| 3,636,241 | 1/1972 | Baumgartner et al. | 174/92 |
| 3,692,926 | 9/1972 | Smith | 174/92 |
| 3,935,373 | 1/1976 | Smith et al. | 174/77 R |
| 4,103,911 | 8/1978 | Giebel et al. | 174/77 R |

FOREIGN PATENT DOCUMENTS 1235847  6/1971  United Kingdom ................. 174/77 R Primary Examiner—Roy N. Envall, Jr.
Attorney, Agent, or Firm—Cruzan Alexander; Donald M. Sell; James V. Lilly

[57] ABSTRACT

A cable splice case for communications cables comprises a two part outer shell, divided perforate end plates, and a cable collar for each cable end. The cable collar is grooved to receive an end plate gasket. A preferred form of cable collar is in two parts and fits together over a mastic winding between two washers on the cable to form a hermetically sealed cable end structure which is retained during reentry of the splice area. Details of gasket, tie bar, and strain relief structure are given.

18 Claims, 21 Drawing Figures

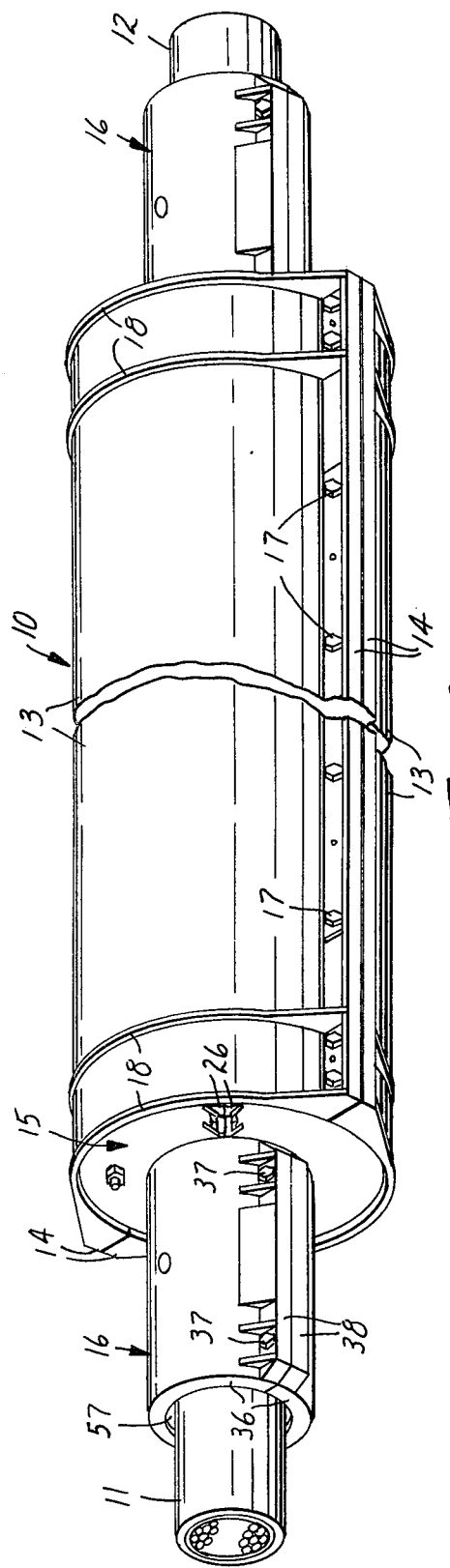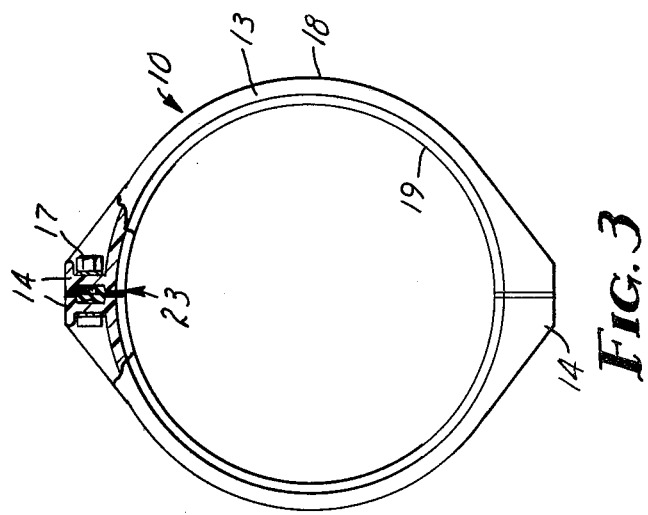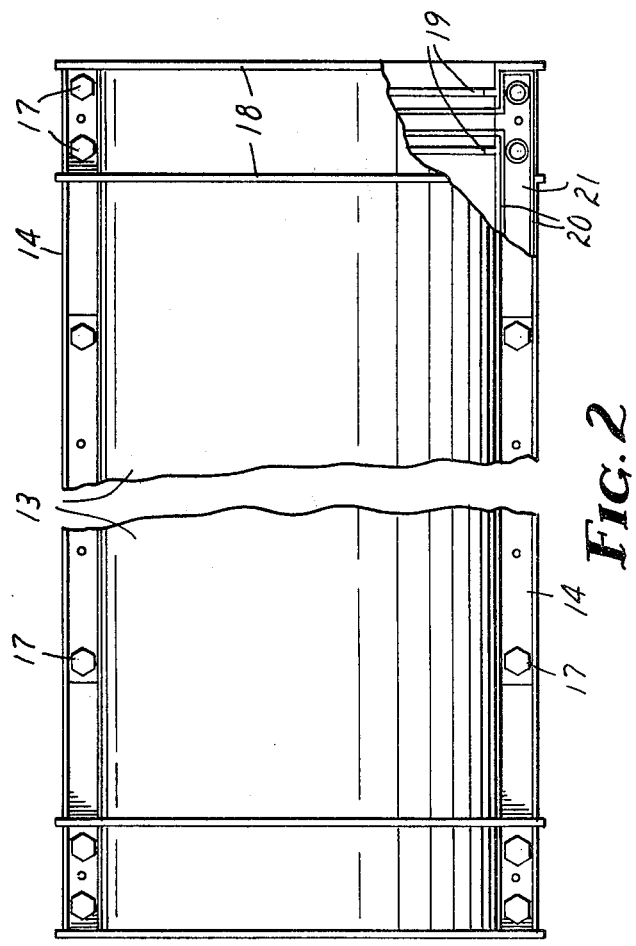

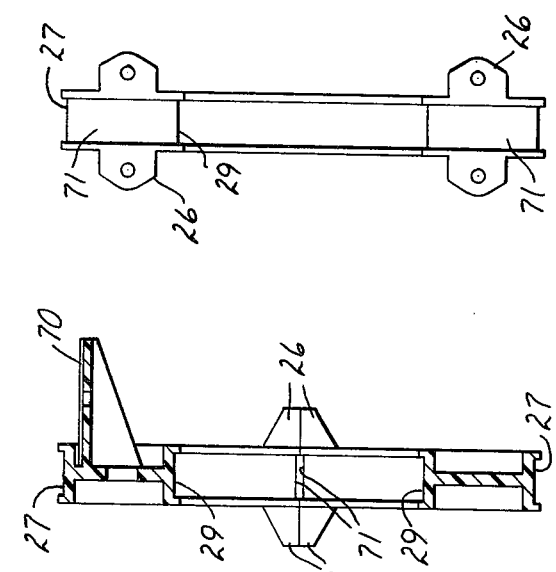
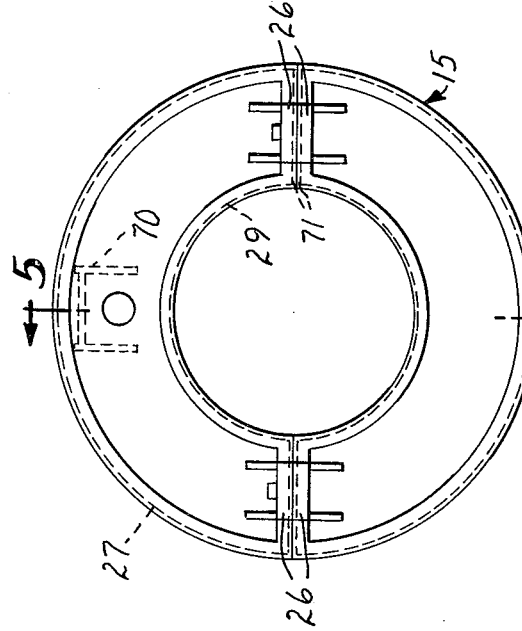
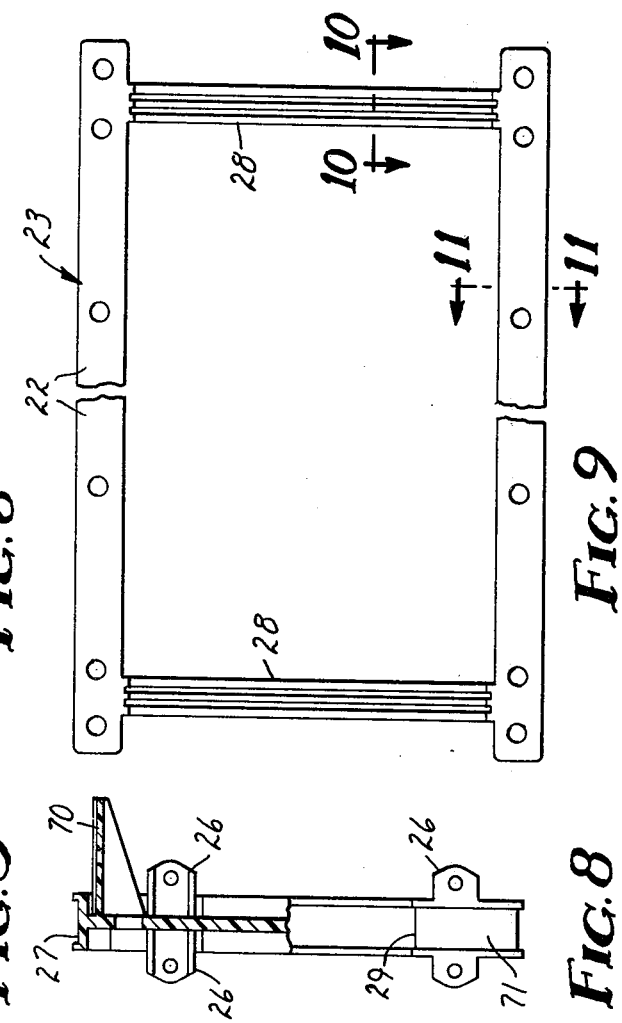
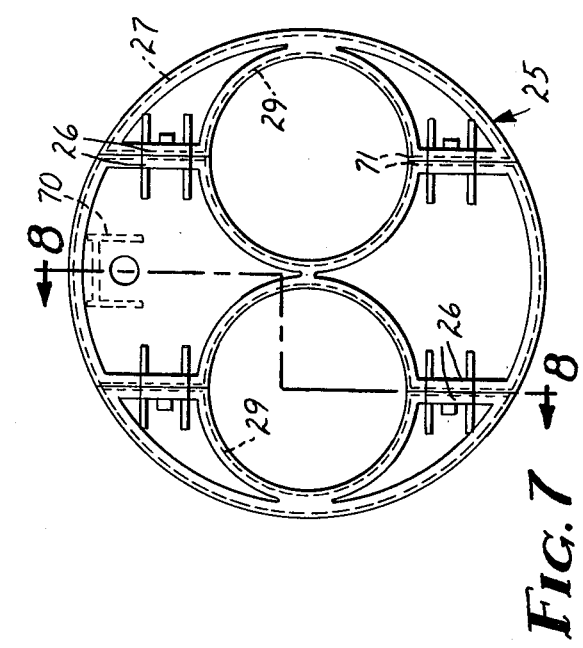

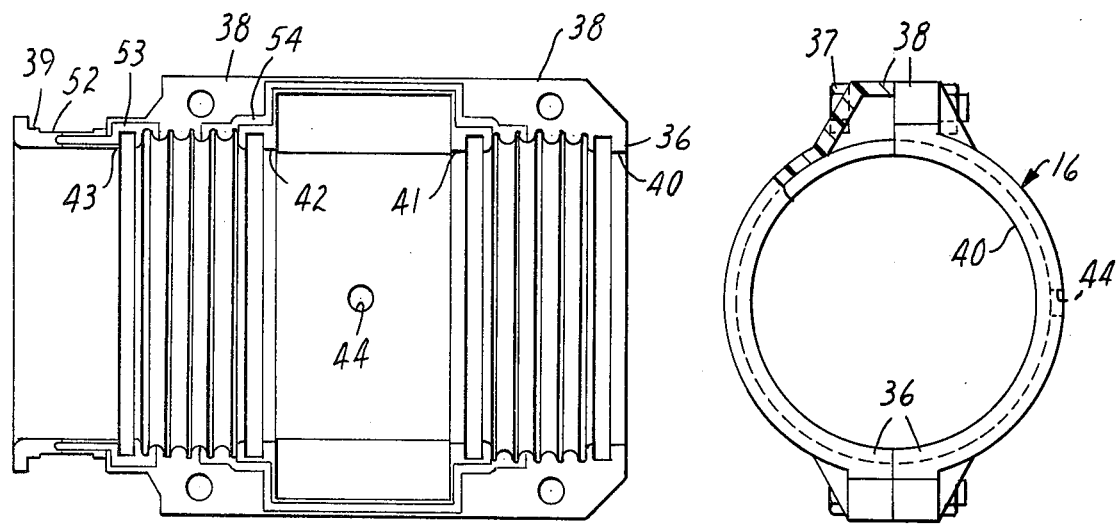
*FIG.15*  *FIG.16*
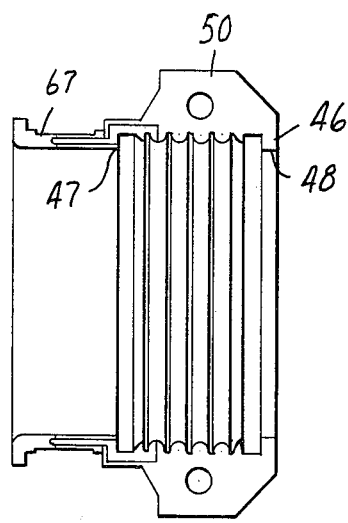 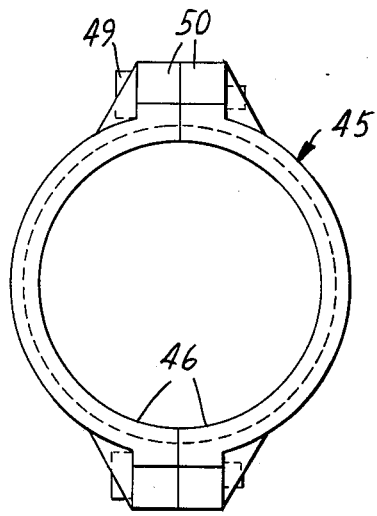
*FIG.17*  *FIG.18*
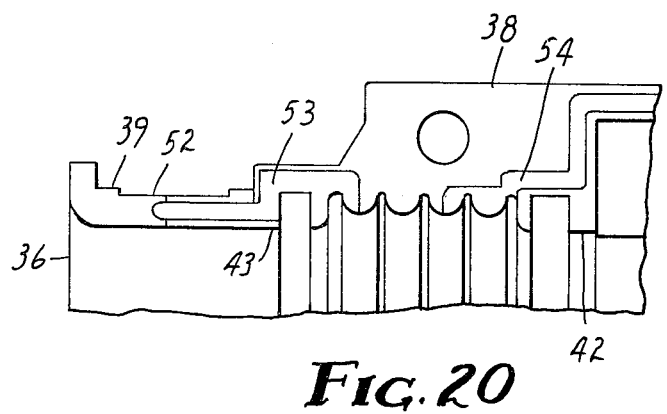
*FIG.20*

CABLE SPLICE CASE

This invention relates to enclosures for splice areas in telecommunications cables.

Telephone cables may carry hundreds or thousands of pairs of insulated copper wires, enclosed in a flexible metal shield and one or more plastic tubular sheaths. To prevent ingress of moisture, the cable may be supplied with dry air or nitrogen under pressure, or may be filled with grease. Where two or more cable ends are connected together, as in extending a cable or in tapping into an extended cable, the splice areas must also necessarily be protected. By the term "cable end" is here meant an area of exposure of the insulated conductors by removal of the outer sheath or sheaths, shield, and any additional wrappings or coverings, whether or not the conductors themselves are terminated.

One prior art form of splice protection has involved enclosing the splice area between two trough-like half shells having constricted ends which fit snugly about the cable ends and against enclosed sealing rings or gaskets, as shown for example in U.S. Pat. No. 3,936,590. Only a narrow range of cable diameters can be accommodated.

Another well known form of splice case uses separate end plates and outer shells, different end plates permitting application to cable ends of different diameter, an example being shown in U.S. Pat. No. 3,636,241. The end plates, rather than the ends of the cover or shell, fit around the cable ends. Under conditions of application in the field, leak proof seals to the cable sheaths are time consuming, and difficult to attain, particularly when two or more cable ends are to pass through a single end plate. Reentry of the splice area, e.g. to add or delete a cable end, requires breaking of the bond between cable end and end plates.

A particular difficulty has been encountered in the application of splice cases to splice areas in pressurized double sheath cable installations where loss of pressure from within the inner sheath to the space between sheaths must be avoided. The industry has attempted to overcome the difficulty principally by wrapping around the adjacent ends of the sheaths with a series of adhesive tapes, forming an elongate wrapped or bandaged area which must be enclosed within an outer shell and necessitating the substitution of a shell of drastically increased length.

The present invention employs a longitudinally split outer shell and a choice of segmented end plates, which themselves have novel features, while in addition and more particularly providing novel cable collar means which are separate from the end plates and may therefore be applied independently, for example in the factory and under controlled conditions as well as in the field. Reentry without disruption of the seal to the cable end is made possible. Splice areas involving double sheath cable ends are covered without requiring a shell of extended length.

These and other features of the invention will now be described in more detail in connection with the appended drawing, in which:

FIG. 1 is a view in perspective of a splice case of the invention, as applied to a cable splice area;

FIG. 2 is a plan view, partly in section, of the outer cover or shell of the case of FIG. 1;

FIG. 3 is an end elevation of the shell of FIG. 2, partly in section;

FIG. 4 is a front elevation of one form of end plate assembly having a single cable passage;

FIG. 5 is a sectional view at 5—5 of the assembly of FIG. 4;

FIG. 6 is an inner edge view of one segment of the end plate of FIG. 4;

FIG. 7 is a front elevation of an end plate assembly having two cable passages;

FIG. 8 is a section at 8—8 of the assembly of FIG. 7;

FIG. 9 is a plan view of a preferred form of shell gasket;

FIG. 15 is a top plan view of the bottom half of a cable collar assembly for a double sheath cable end, and FIG. 16 is an end elevation of the assembled cable collar, partly in section;

FIG. 17 is a top plan view of the bottom half of a cable collar assembly for a single sheath cable end, and FIG. 18 is an end elevation of the assembled cable collar;

FIG. 20 shows a detail of the structure of FIGS. 15 and 17; and

Figure 10:
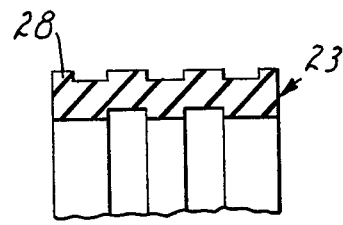
FIG. 10 is a section at 10—10 of the gasket of FIG. 9.

FIG. 1 illustrates a cable splice case 10 applied over a splice area between two double sheath cable ends 11, 12. The case comprises two identical generally semicylindrical half shells 13 joined together at flanges 14, single opening end plates 15, and cable collars 16.

The shells 13 are shown in more detail in FIGS. 2 and 3. The flanges 14 are perforate to receive fasteners 17. External parallel ridges 18 at each end provide reinforcement at the end areas and internal ridges 19 define the location of the end plates in the assembled case.

Figure 11:
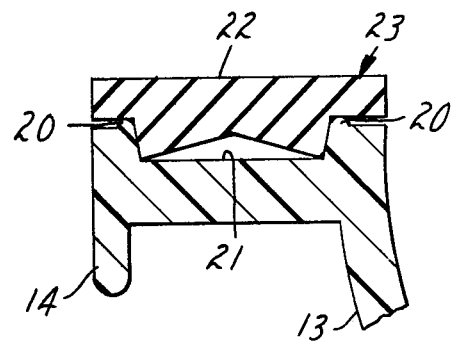
FIG. 11 is a section at 11—11 of the gasket of FIG. 9 together with a portion of the retaining flange of the shell.

The faces of the flanges 14 are longitudinally ridged and grooved, with rounded ridges 20 along both sides of slant sided groove 21 (FIG. 11). The side members 22 of gasket 23 of FIG. 9, the thickened central portion of which has a concave transverse section as shown in FIG. 11, fit over these flange faces and when compressed in place by fasteners 17 provide a leakproof seal. The longitudinally ridged and grooved end members 28 of the gasket 23 lie between the internal ridges 19.

Figure 13:
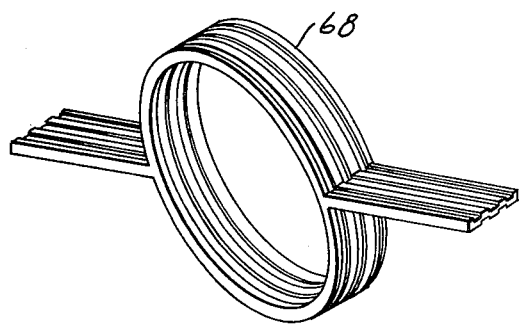
FIG. 13 is a view in perspective of a preferred form of end plate gasket.

Circular end plates 15, 25 (FIGS. 4–8) will be seen to be in segments, being divided along planes parallel to the axis and diametrically of each cable passage. The segments are channeled about their peripheries and are held together and about the cable collar or collars by fasteners passing through opposed lugs 26. External channels 27 receive end members 28 of gasket 23; internal channels 29 and 71 are provided to receive gaskets 68 (FIG. 13) which have the same ridged and grooved cross section as said end members 28 and as shown more clearly in FIG. 10.

End plates with apertures for three or more cable ends are sometimes required and are analogously segmented, grooved, and provided with fasteners and lugs. In each instance the number of segments is one more than the number of apertures.

Figure 12:
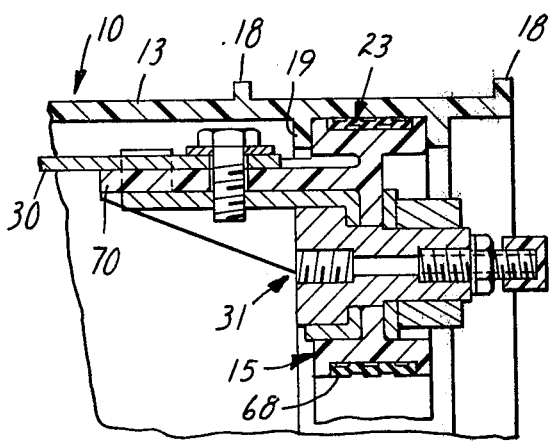
FIG. 12 is a detail in cross section showing a portion of an end plate equipped with tie bar bracket and gas fitting.

The two end plates will normally be tied together in predetermined radial and axial position within the case by a tie bar 30 (FIG. 12) extending between the plates and attached at each plate to a tie bar fitting assembly 31 which is supported by lugs 70 extending from opposed end plate segments. The assembly 31 is perforate, e.g. for introduction of gas under pressure where desired. It may also serve as an external ground connection when connected internally of the shell to the cable shield. The fitting is normally closed to prevent flow of gas.

Exemplary cable collar structures are next to be described.

Figure 14:
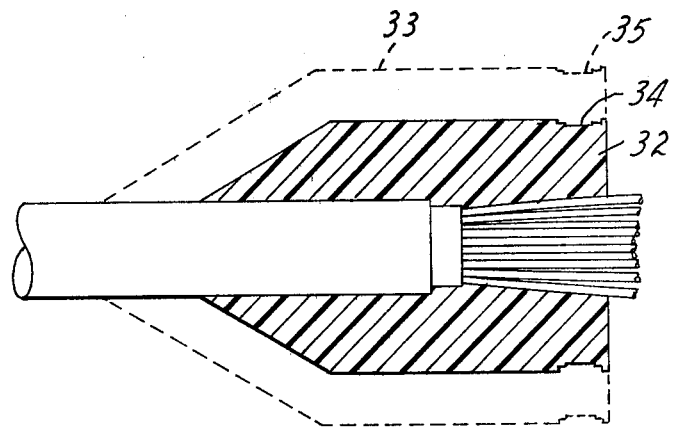
FIG. 14 is a view in longitudinal cross section of a molded cable collar applied on a single sheath cable end, with a one piece mold indicated in dotted outline.

FIG. 14 illustrates a cable end 11 provided with a unitary polymeric molded cable collar 32. The molding composition, e.g. a known polyurethane composition, is applied as a liquid in a tubular mold 33 having a constricted end fitting closely about the cable. The composition penetrates and seals all of the interstices at the cable end and hardens to a gas impervious adherent body having an annular groove 34 around the end adjacent the exposed wires. For factory application this form of cable collar permits rapid and uniform production. The mold 33 may be in two segments so that it may be removed and reused after the liquid composition has hardened. It may equally well be of unitary construction, in which case it is itself formed with annular groove 35 and remains in place as additional reinforcement.

The cable collar 16 of FIG. 1 is generally tubular in shape and is formed of two substantially identical longitudinally flanged semicylindrical halves 36 as shown in FIGS. 15 and 16, held together by fasteners 37 passing through opposed flanges 38. The collar is externally grooved at one end at groove 39 and internally ribbed at ribs 40–43. Between adjacent ribs 40–41 and 42–43 the inner surface is ridged and grooved as shown; between ribs 41 and 42 the interior is expanded within the flanged area to form a chamber of enlarged cross section, and one of the halves may be perforate as at opening 44 for purposes to be described.

The collar 16 is particularly useful with double sheath cable, making possible a gas tight seal to both inner and outer sheaths and isolating the two while requiring no extension of the shell length.

A simpler form of collar assembly 45, formed of two halves 46, is shown in FIGS. 17 and 18 to provide an outer annular groove 67 and a single pair of inner ribs 47, 48, the latter separated by a ridged and grooved surface as in the collar of FIG. 15. The two collar halves are held together by fasteners 49 passing through opposed flanges 50.

Additional structural details applicable to collar halves 36 and 46 are given in FIG. 20 which shows on an enlarged scale an end portion of a longitudinal flanged edge of the half collar of FIG. 15.

The bottom wall of the groove 39 is shown in FIG. 20 to be centrally shallowly grooved at groove 52, for the purpose of positioning a gasket 68 during assembly of the case. The same structure is applicable also to the cable collars of FIGS. 14 and 17. The ring portion of the gasket is thereby located in place centrally of groove 39 and in position to fit precisely within the interior grooves 29 and 71 of end plate 15.

Slight inwardly open depressions 53, 54 are also provided in the flat flanged edge surface of the collar half 36 adjacent the ridged and grooved surface and the ribs 43, 42, as further indicated in FIG. 20. Analogous edge structure is indicated in the half collar of FIG. 17. These depressions result in a shallow cavity between the opposing flanges, which is open inwardly of the collar.

Figure 19:
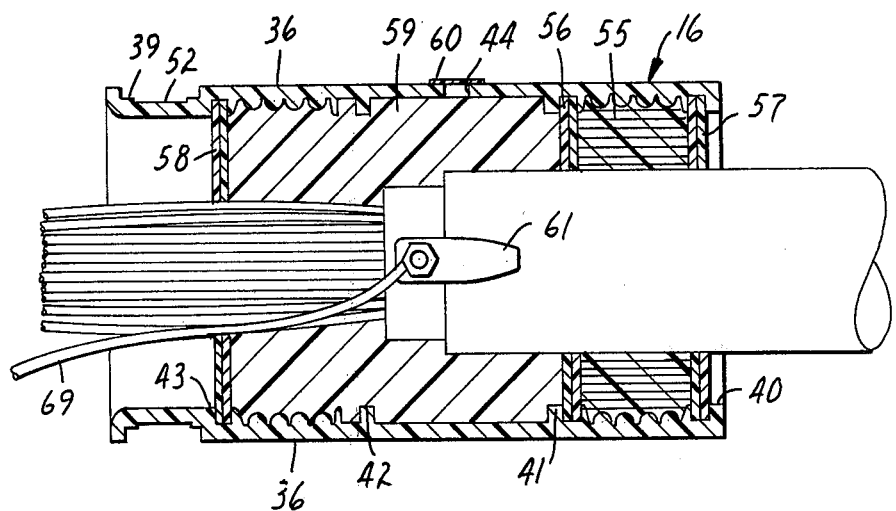
FIG. 19 is a view in longitudinal cross section showing an encapsulated single sheath cable end in a cable collar assembly as illustrated in FIGS. 15 and 16.

Another application of the cable collar of FIGS. 15 and 16 is shown in FIG. 19. The collar, sealed to the cable by mastic sealant 55 between pairs of split half washers 56, 57, and with the separated conductors and ground connection compacted for passing through a third pair of half washers 58, is filled with liquid encapsulant or molding composition which penetrates and seals the interstices in the cable end and then hardens as polymeric filler 59. The liquid may be applied through the central opening 44 which may then be sealed, e.g. with adhesive tape 60, or the washer 58 may be omitted, the opening 44 sealed, and the liquid poured into the open end of the collar while the latter is held upright.

FIG. 19 further illustrates one method of maintaining contact with the cable shield. A metal probe 61 is forced between the sheath and shield at the end, and a conductor 69 attached to the probe extends across the splice area to a similar probe in the adjacent cable end. Alternatively, the conductor 69 may be attached to the conductive tie bar fitting of FIG. 12 or to an external metal contact member sealed within the hole 44.

Figure 21:
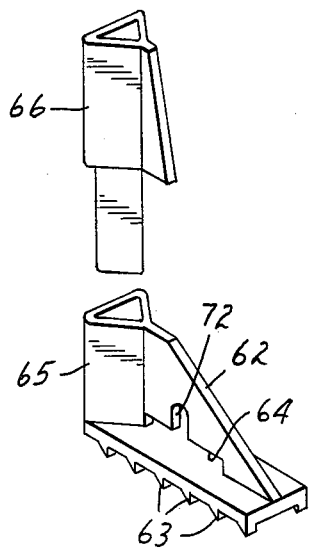
FIG. 21 is a view in perspective of a strain relief element.

Strain relief is supplied by means of reinforced braces 62 (FIG. 21), two or more of which are to be uniformly spaced and strapped to the cable end inwardly of the end plates. The braces grip the outer cable sheath with extended tangs 63 and are held firmly in place by a strap type hose clamp, not shown, passing around the cable and through the opening 64, with the upright 65 braced against the end of the cable collar as it extends through the end plate within the case. A bolt, not shown, may be fastened within aperture 72 to serve as a common point of attachment for ground conductors 69. An extension 66 fitting within the open upright may be added when needed for use with cables of smaller diameter.

An illustrative procedure for application of the cable splice case to a cable splice area in a double sheath cable installation will now be described in terms primarily of the installation illustrated in FIG. 1.

The cable ends are prepared by cutting back the outer layers to expose the metal shield and the inner sheath, and are suitably positioned on a rack or other support and temporarily clamped in place. Ground connectors, for example as described in U.S. Pat. No. 3,778,749, are applied to the exposed shields and interconnected. A bottom half shell, with its gasket and the lower portions of the two end plates installed, is supported in place beneath the splice area to assist in properly locating the cable collars. Mastic tape of appropriate width is convolutely wound about the outer and inner sheaths of each cable at the required locations and to required thickness, sufficient to slightly overfill the designated spaces within the collars, and washers are placed over the cable ends and against both sides of each winding. A suitable tape is an uncured compounded butyl rubber product such as Western Electric "B" Sealing Tape. The washers are desirably composed of pairs of half-washers as described and claimed in copending application Ser. No. 58,449.

The cable collars are next applied. The bottom half of the collar is put in place beneath the cable at the mastic winding, strips of mastic are placed within the edge depressions, the upper half is applied, and the two fastened tightly together. The washers fit against the retaining ribs. As the two halves of the collar are drawn together, the mastic conforms and seals to the ridged and grooved surface between the ribs and to the washers and the cable sheaths, and the washers are forced against the retaining ribs and are bowed or bulged slightly under the force transmitted by the surplus mastic.

Ring gaskets 68 (FIG. 13) are next placed over the ends of the collars, fitting into the secondary grooves 52. The collars are laid against the lower end plate segments and the upper segments are applied and fastened in place.

A tie bar 30 of appropriate length is nested into end plate lugs 70 and fastened firmly in place. The opposing wire ends are then connected, during which process the lower half-shell may, if desired, be removed for ease of access to the splice area. After strain relief fittings, have been added, the two gasketed halves of the outer shell are assembled over the whole to complete the operation. There is achieved a hermetically sealed, moisture and gas proof, compact, reopenable splice area enclosure. Passage of gas or moisture from between outer and inner sheath to the area of the insulated wires across the cut end of the inner sheath is prevented, without requiring an unduly elongate outer shell.

In place of the ring gaskets 68, strips of mastic tape or cord may less conveniently be made to serve as gaskets in the grooves 29 and 71 of the end plate segments, thereby permitting application of the splice case over a previously completed cable junction.

Although each of the cable collar structures described is capable of effective preparation and application under field conditions, a particular advantage is to be attained where these components are preattached to cable ends in the factory. Cable collars dimensioned to fit specified end plate openings are capable of application to cable ends of various diameters, thereby enhancing the versatility of the system while assuring a fully effective seal between collar and end plate.

A further advantage accruing from the use of separate cable collars is that the seal to the cable remains unbroken during reentry, for example when adding or deleting a cable end. The same cable and cable collar assembly may thus be used with a variety of end plates depending on the particular service arrangements required.

What is claimed is as follows:

1. A splice case for enclosing a splice area in a communications cable system, comprising an outer shell, end plates for said shell each having at least one cable accepting aperture, and, for each said aperture, a cable collar; said shell comprising two longitudinally flanged semicylindrical halves and having two internal annular ridges at each end; each of said plates fitting within said shell between said two ridges, being split along a paraxial plane diametrically of each said aperture into a number of segments one more than the number of its apertures, and each segment being grooved centrally of its edge about its periphery; each of said collars fitting over a cable end and within one of said apertures and being exteriorly annularly grooved adjacent one end.

2. Splice case of claim 1 wherein said cable collar comprises a generally tubular casing divided into two longitudinally flanged sections along an axial plane, said collar having an annularly ridged and grooved interior surface terminating in inwardly extending annular ribs adapted for supporting retaining washers thereagainst.

3. Splice case of claim 2 wherein said cable collar includes two of said annularly ridged and grooved interior surfaces each terminating in said annular ribs and separated by a central interior surface defining an area of increased cross section.

4. Splice case of claim 2 wherein the flat flanged edges of each section of said cable collar are centrally depressed to form a mastic accepting depression extending along the portion of said edges adjacent said ribbed and grooved surface and said ribs, the resulting cavity between opposing flanged edges being open inwardly of said collar.

5. Splice case of claim 1 wherein one segment of each said end plate is perforate, includes an extension adjacent the perforation, and carries a tie bar fitting attached to said extension and passing through said perforation.

6. Splice case of claim 1 wherein the two halves of said shell each are grooved along their longitudinal flanges to provide a slant sided longitudinal groove and are ridged to provide rounded ridges along both sides of said groove, and wherein is included a gasket member having longitudinal segments fitting over said ridges and into said grooves and having a concave transverse section adjacent the bottom of said groove.

7. A cable splice assembly comprising: at least two cable ends having electrical continuity therebetween; an externally annularly grooved cable collar applied about each said cable end and sealed about the grooved area within a cable receiving aperture in a segmented end plate; an outer shell comprising two mating half shells sealed about said end plates; and wherein at least one said cable collar comprises a generally tubular casing divided into two sections along an axial plane and having at least one annularly ridged and grooved interior surface section terminating in inwardly extending annular ribs; retaining washers about said cable and between each said rib and the adjacent ridged and grooved surface; a winding of mastic about said cable between the two washers; said washers being supported against said ribs and said mastic filling the space between said washers and between said cable and said ridged and grooved interior surface to provide a hermetic seal.

8. Cable splice assembly of claim 7 wherein: at least one of said cable ends is a double sheath cable end having a shortened outer sheath and an extended inner sheath, the corresponding cable collar having two of said ridged and grooved surfaces each terminating in inwardly extending annular ribs, one of said surfaces being about said outer sheath, the other about the extended inner sheath.

9. A cable splice assembly comprising: a cable end; a polymeric cable collar molded onto said cable end, having a circular cross section and being exteriorly annularly grooved; a multiple segment end plate having a cable accepting aperture, each segment being peripherally grooved, said plate fitting over said collar at said exterior groove; gasketing material filling the groove in said collar and the grooves of said end plate adjacent thereto; and an outer protective shell fitting about said end plate and said splice.

10. A cable splice assembly comprising: a cable end; a molded fitting about said cable end and having a circular cross section and being exteriorly annularly grooved; a polymeric encapsulant filling said mold and sealing said cable end; a multiple segment end plate having a cable accepting aperture, each segment being peripherally grooved, said plate fitting over said mold at the exterior groove thereof; gasketing material filling said groove and the grooves of said end plate adjacent thereto; and an outer protective shell fitting about said end plate and said splice.

11. A generally tubular cable collar for use with a splice case having an end plate, said collar comprising two substantially identical longitudinally flanged semicylindrical halves, said collar being externally annularly grooved adjacent one end for use with said end plate, and having at least one pair of internal ribs separated by an annularly ridged and grooved surface.

12. Collar of claim 11 wherein are two pairs of said separated internal ribs and, between said two pairs, a central chamber of enlarged cross section.

13. Collar of claim 11 wherein the longitudinal flat flanges of said halves have a depressed surface area adjacent the ridged and grooved surface and the adjoining ribs, the resulting cavity between opposing flanges opening inwardly of said collar.

14. A cable end adapted for enclosure within a splice case, said case having an end plate, and comprising: an assembly of insulated wires within an outer protective sheath; a winding of mastic tape about said sheath; retaining washers about said cable end at both sides of said winding; a generally cylindrical cable collar, comprising two semicylindrical longitudinally flanged halves and having at least one annularly ridged and grooved interior surface section terminating in inwardly extending annular ribs and said collar being exteriorly annularly grooved for combination with said end plate, assembled about said cable end with said washers reatined against said ribs and said mastic filling the space between washers, cable and ridged and grooved surface to provide a hermetic seal.

15. Cable end of claim 14 wherein said cable end includes a shortened outer sheath and an extended inner sheath and wherein each sheath supports a said winding and said washers, and said collar includes two ribbed, ridged and grooved sections separated by a section of increased cross sectional area.

16. Cable end of claim 14 wherein said flanged halves include depressed surface areas in the opposing flange surfaces adjacent the ribbed, ridged and grooved surfaces, the resulting cavity opening inwardly of said collar and being filled with mastic.

17. Cable end of claim 14 wherein a hardened liquid encapsulant fills the terminal interstices within said cable end and the adjacent interior of said collar.

18. Method of protecting a splice area in multiple wire communications cables, comprising: sealing onto each cable end a cable collar having an exterior annular groove; sealing over each said collar at said groove a segmental end plate; and sealing over and between opposing end plates a segmental outer shell.

* * * * *